Feb. 20, 1945.  E. J. BARTH ET AL  2,369,936
DUAL STEERING CONTROL
Filed Nov. 19, 1943   2 Sheets-Sheet 2
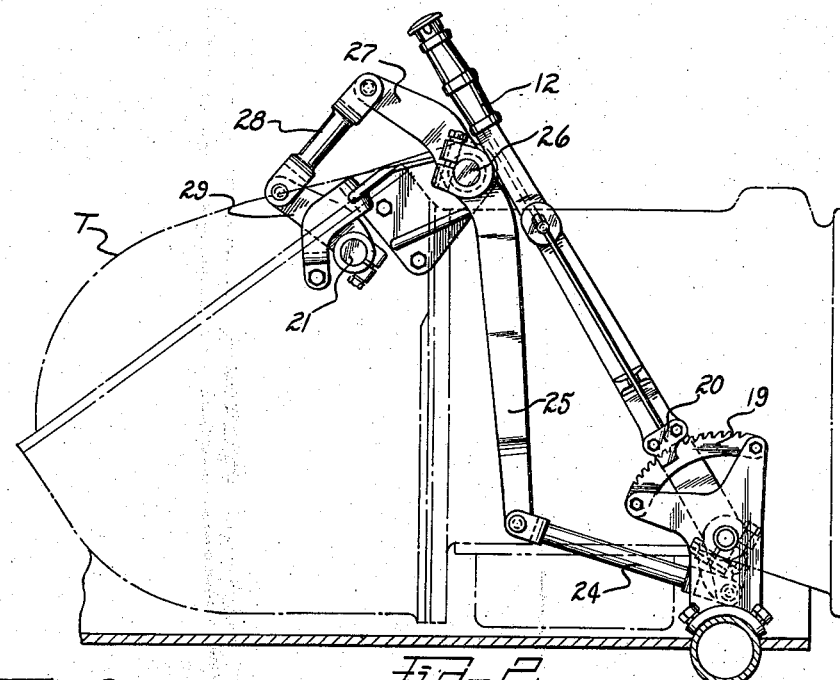
Fig-2
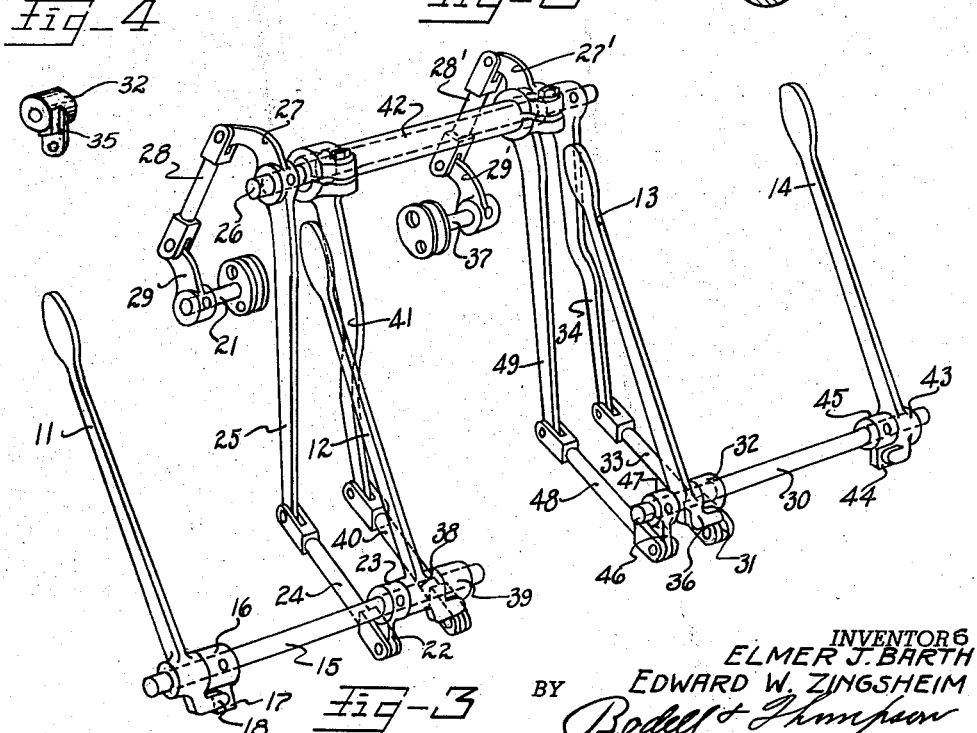
Fig-4
Fig-3
INVENTORS
ELMER J. BARTH
EDWARD W. ZINGSHEIM
BY
Bodell & Thompson
ATTORNEYS Patented Feb. 20, 1945

2,369,936

UNITED STATES PATENT OFFICE 2,369,936

DUAL STEERING CONTROL

Elmer J. Barth and Edward W. Zingsheim, Toledo, Ohio, assignors to Spicer Manufacturing Corporation, Toledo, Ohio, a corporation of Virginia Application November 19, 1943, Serial No. 510,930

7 Claims. (Cl. 180—9.2)

As is well known, vehicles of the crawling type embodying tractor belts or tracks are actuated by shaft sections connected, respectively, to sprockets over which the tracks run, the shaft sections being connected together by a differential gearing, and the vehicles are steered around corners by holding one or the other of the shaft sections, or one side gear or the other of the differential gearing, stationary, as by brakes controlled by the driver. This invention relates to steering mechanisms for steering the vehicle by holding one side or the other of the differential stationary and has for its object a steering mechanism including two pairs of levers, one operable for applying one brake band, say the left hand brake band, when a turn is to be made to the left, and the other to apply the right hand brake band, when a turn is to be made to the right, the two pairs of levers being operable to effect the same result, but with neither pair actuating the other pair.

The invention further has for its object such a steering mechanism involving two pairs of right and left levers, which mechanism is particularly simple and economical in construction.

The invention further has for its object a steering mechanism including pairs of levers located on opposite sides, that is, the right and left sides of the vehicle frame or in case of military tanks, on opposite sides of the transmission casing, each pair of levers being a right and left lever, or levers, one for effecting right hand turns and the other for effecting left hand turns, and interconnections between the levers including transverse shafts extending between the two pairs of levers crosswise of the transmission casing, one being operable by either right hand lever of the pairs, and the other by either left hand lever of the pairs, with suitable motion transmitting means between these shafts and right and left steering members, lost motion couplings or one-way clutch devices between each lever and the shaft it operates for permitting each lever, as each right hand lever or left hand lever, to be operated to effect the steering without actuating the companion right hand or left hand lever of the other pair. As the vehicle is usually steered by applying brake bands, the steering members are shafts or studs which control the application of the brake mechanism.

The invention consists in the novel features and in the combinations and constructions hereinafter set forth and claimed.

In describing this invention, reference is had to the accompanying drawings in which like characters designate corresponding parts in all the views.

Figure 2 is a side elevation of parts seen in Figure 1.

Figure 3 is a somewhat diagrammatic view in perspective to illustrate the linkage shown in Figure 1.

Figure 4 is a perspective view of one of the parts shown in Figures 1 and 2.

Figure 1:
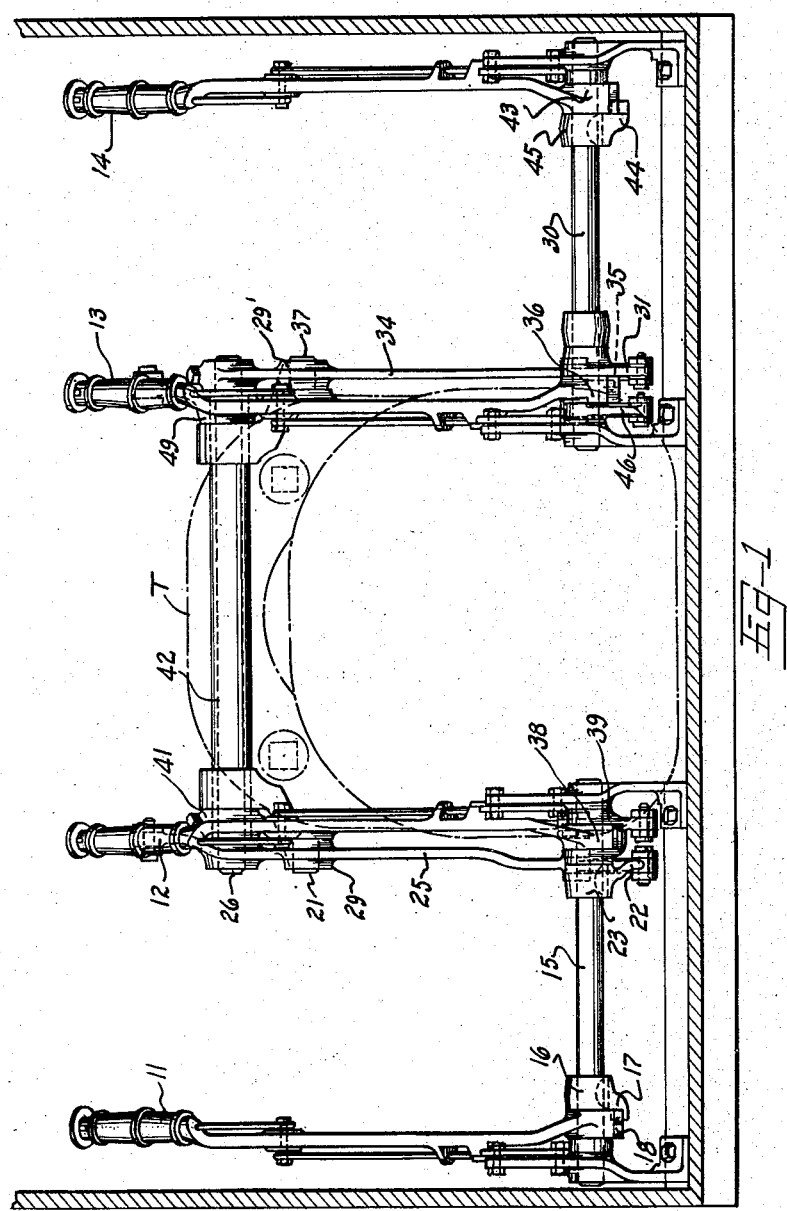
Figure 1 is an elevation of this mechanism, the contiguous portion of the outside housing or body of the vehicle being shown in section, and the position of the transmission housing of the vehicle, as a military tank, being shown in broken lines.

The dual steering control comprises right and left brake shafts which, when operated, apply brake bands, two pairs of right and left levers, the right levers being operable to apply one brake band and the left levers to apply the other brake band, motion transmitting mechanism operated by the levers to apply the brake band including lost motion means, whereby when one lever of one pair is operated, the other lever of that pair remains stationary or is not effected by the operation of the first pair.

11 and 12 designate the left and right levers of one pair; 13 and 14, the left and right levers of the other pair. The levers 11 and 12 are located on the left hand side of the transmission casing T of a vehicle and the pair of levers 13 and 14 on the right hand side. Ordinarily, the levers 11 and 12 are used for steering the vehicle, and the levers 13 and 14 for steering it in emergencies. The left hand levers 11 and 13 of each pair operate to apply a left hand brake to cause the track on the left side of the machine to be held stationary or to run slower than the track on the right side, and thus cause the vehicle to turn to the left. Either one of the levers 12 and 14 may be operated to apply the right hand brake and cause the vehicle to turn to the right. The lever 11 is pivotally mounted on the shaft 15 but is coupled thereto by a lost motion coupling or a one-way clutch including a collar or section 16 keyed to the shaft 15 and having a lug or tooth 17 for coacting with a complemental lug or shoulder 18 on the hub of the lever 11, when the lever is moved in such direction as to apply the brake. However, this clutch permits the shaft 15 to be operated by the lever 13 without applying any turning force to the lever 11. The lever 11, as well as the other levers 12, 13 and 14, is held in its operated position by means of a rack and latch device 19 and 20 (Figure 2) of any suitable construction.

The motion is transmitted from the shaft 15 to the brake operating shaft 21 which operates the left hand brake through suitable means, as a rock arm 22 extending from a hub 23 keyed to the shaft 15, and connected to means, as a link 24, which is connected to a rock arm 25 mounted on the shaft 26 to rock the same, rock arm 27 on the shaft 26, link 28 connecting the rock arm 27 and a rock arm 29 on the left hand brake operating shaft 21. The same shaft 26 can be operated by the left hand lever 13 located on the right hand side of the transmission T for operating the rock arm 27, link 28, rock arm 29 and left hand brake operating shaft 21, and incidentally operating the arm 25, link 24 and shaft 15, but not operating the lever 11, because of the lost motion between the lug 17 and lug 18 of the lever 11. This operation by the left hand lever 13 of the right hand pair of levers 13 and 14 on shaft 30, corresponding to the shaft 15, connected to the shaft 26 through a rock arm 31 on the hub 32 loose on the shaft 30, a link 33, corresponding to the link 24, and a rock arm 34, corresponding to the rock arm 25 mounted on the shaft 26 to transfer the motion through the shaft 26 to the left hand operating shaft 21 through the parts 27, 28 and 29. The motion of the lever 13 is transmitted to the collar 32 through a lost motion, as a lug 35 on the hub 32 coacting with a complemental shoulder on the hub 36 of the lever 13, which hub is loosely mounted on the shaft 30. Thus, operation of the lever, although it idly operates on the shaft 30, does not transmit motion to the lever 14, but operation of the lever 13 transmits motion to the shaft 26 and to the left hand brake operating shaft 21 without operating the lever 11.

The right hand levers 12 and 14 operate a right hand brake operating shaft 37. The right hand brake lever 12 of the left hand pair of steering or brake levers has its hub 38 loosely mounted on the shaft 15 to rock about the same adjacent a U-shaped bracket 39 also loosely mounted on the shaft 15 and connected through link 40 and rock arm 41, similar to link 24 and rock arm 25 and the link 33 and rock arm 34, to a tubular shaft 42 rotatable about the shaft 26 and having at its right hand end a rock arm, link and second rock arm corresponding to the parts 27, 28 and 29, the last rock arm being mounted on the right hand brake shaft 37. These two shafts 26 and 42 extend across the top of the transmission casing T. The hub 38 and the U-shaped collar 39 are coupled together by a one-way clutch device in the same manner that the levers 11, 13 and 14 are coupled to the collars 16 and 32. The right hand lever 14 of the right hand pair is mounted on the shaft 30 through a one-way clutch device consisting of the hub 43 loosely mounted on the shaft 30 and coacting with a lug 44 on a collar 45 keyed to the shaft 30 and the motion of the shaft 30 is transferred to the right hand brake operating shaft 37 through a rock arm 46 on a hub 47 keyed or otherwise secured to the shaft 30, this arm 46 being connected through link 48, rock arm 49, similar to the link and rock arm 40 and 41, to the tubular shaft 42 which, as before stated, is connected to the right hand operating stud or shaft 37 through mechanism corresponding to the parts 27, 28 and 29.

Ordinarily, the vehicle is steered by means of the left hand pair of levers 11 and 12 and the operation of these levers does not move the right hand pair of levers 13 and 14, due to the lost motion effected by the one-way clutches. On the other hand, the operation of the right hand pair of levers 13 and 14 does not move the pair of levers 11 and 12.

The concentric shafts 26 and 42 are shafts common to the left hand brake operating members and the right hand brake operating members, respectively, the collar 16 with its one-way clutch coacting with the lug 18 of the lever 11. The shaft 15, rock arm 22, link 24, lever 25 constitute motion transmitting means including a one-way clutch device between the shaft 15 and the shaft 26, the parts 27, 28 and 29 constituting motion transmitting means operated by the shaft 26 to actuate the steering member 21, that is, the operating shaft or stud of the brake applying mechanism. The bracket 39 loose on the shaft 15 coacts through the one-way clutch device with the hub 38 of the right hand lever 12 loosely mounted on the shaft 15, link 40, rock arm 41, corresponding to the link 33 and rock arm 34, constituting motion transmitting means between the right hand lever 12 of the left hand pair, and the shaft 42, which shaft 42 is connected to the other steering gear member or the shaft or stud 37, which applies the right hand brake through parts 27', 28' and 29', similar to the parts 27, 28 and 29. The motion of the left hand lever 13 of the right hand pair is transmitted to the shaft 26 through motion transmitting means including the collar 32 on the shaft 30 and having a one-way clutch device coacting with the hub 36 of the lever 13, link and rock arm 33 and 34 corresponding to the link and rock arm 24, 25, the rock arm 34 being mounted on the shaft 26. The motion of the shaft 26, when actuated by the lever 13, is transferred to the left hand brake applying member 21 through the parts 27, 28 and 29.

The one-way clutch device consisting of the collar 45 on the shaft 30, the hub 43 of the lever 14 loosely mounted on the shaft, rock arm 46, link 48 and rock arm 49, corresponding to link 24 and rock arm 25 constitute motion transmitting means between the lever 14 and the outer shaft 42 of the concentric shafts, the rock arm 49 being mounted on the shaft 42. The shaft 26 transmits the motion of both left hand steering levers, and the shaft 42 transmits the motion of both right hand steering levers, and owing to the one-way clutch devices, the operation of either right or left steering lever does not affect or move the other right or left steering lever. Although all the levers 11, 12, 13 and 14 are mounted on the shafts 15 or 30, the shaft 15 transmits only the motion of the lever 11, although it idles when the lever 13 is being operated, and the shaft 30 transmits only the motion of the lever 14, although it idles when the lever 12 is being operated.

What we claim is:

1. A dual steering mechanism for motor vehicles including right and left steering members, two pairs of operating levers for each of said members, each pair including right and left levers, motion transmitting means between the right levers of the pairs and one of said members and between the left levers of said pairs and the other of said members including two shafts, one for effecting left hand turning and the other right hand turning, and motion transmitting means between said shafts and said members respectively.

2. A dual steering mechanism for motor vehicles including right and left steering members, two pairs of operating levers for each of said members, each pair including right and left levers, motion transmitting means between the right levers of the pairs and one of said members and between the left levers of said pairs and the other of said members including two shafts, one for effecting left hand turning and the other right hand turning, and motion transmitting means between said shafts and said members respectively, the motion transmitting means between the right hand levers and the left hand levers of each pair and said shafts including lost motion couplings permitting each lever to be operated for producing a turn without operating the other lever operable to produce the same turn.

3. In a dual steering mechanism for motor vehicles, the combination with a transmission casing, of pairs of right and left steering levers on opposite sides of the casing respectively, right and left steering members, shafts for operating said members respectively extending crosswise of said casing and being arranged concentric, motion transmitting means between the shafts respectively and said steering members, motion transmitting means between the right hand levers of each pair and one of said shafts, and motion transmitting means between the left hand levers of each pair and the other of said shafts.

4. In a dual steering mechanism for motor vehicles, the combination with a transmission casing, of pairs of right and left steering levers on opposite sides of the casing, right and left steering members, shafts for operating said members respectively extending crosswise of said casing and being arranged concentric, motion transmitting means between the shafts respectively and said steering members, motion transmitting means between the right hand levers of each pair and one of said shafts and between the left hand levers of each pair and the other of said shafts, each of the motion transmitting means operable by the levers including a one-way clutch device operable to permit operation of one right or left lever without operating the other right or left lever.

5. In a dual steering mechanism for motor vehicles, the combination of two pairs of independently operable levers, each pair including a right hand lever and a left hand lever, a pair of concentric shafts, one shaft being common to the right hand levers of the two pairs, and the other to the left hand levers, right and left steering gear members, motion transmitting means between the shafts and said members respectively, two shafts, one right hand lever and one left hand lever being mounted on each of said two shafts, motion transmitting means between each of said two shafts and one only of the concentric shafts, the levers on said two shafts being rotatably mounted thereon, a one-way clutch device between one lever on each of said two shafts and the shaft permitting the shaft to overrun, motion transmitting connections between the other operating lever on each shaft and the other of said concentric shafts, said other of the levers on each of said two shafts being connected to its motion transmitting means by an overrunning clutch device permitting its motion transmitting means to overrun.

6. In a dual steering mechanism for motor vehicles, the combination with a transmission casing, of pairs of right and left steering levers on opposite sides of the casing, right and left steering members, a pair of concentric shafts extending crosswise of the transmission casing, one shaft being common to the right hand levers of the two pairs and the other to the left hand levers, motion transmitting means between the concentric shafts and said members respectively, two shafts, one right hand lever and one left hand lever being mounted on each of said two shafts, motion transmitting means between each of said two shafts and one only of the concentric shafts, the levers on said two shafts being rotatably mounted thereon, a one-way clutch device between one lever on each of said two shafts and the shaft permitting the shaft to overrun, motion transmitting connections between the other operating lever on each shaft and the other of said concentric shafts, said other of the levers on each of said two shafts being connected to its motion transmitting means by an overrunning clutch device permitting its motion transmitting means to overrun.

7. In a dual steering mechanism for motor vehicles, the combination of two pairs of independently operable levers, each pair including a right and a left hand lever, a shaft common to the right hand levers of the two pairs, a second shaft common to the left hand levers of the two pairs, motion transmitting means between said shafts and the right and left steering members respectively, motion transmitting means between the levers and the shafts respectively, the last transmitting means for the right hand levers including one-way clutch devices and also the motion transmitting means operated by the left hand levers including a one-way clutch device for permitting each left or right hand lever to be operated without operating the companion left or right hand lever.

ELMER J. BARTH.
EDWARD W. ZINGSHEIM.